(12) United States Patent
Abbas et al.

(10) Patent No.: US 11,036,551 B2
(45) Date of Patent: *Jun. 15, 2021

(54) DURABLE PROGRAM EXECUTION (71) Applicant: Microsoft Technology Licensing, LLC, Redmond, WA (US)

(72) Inventors: Samar Abbas, Woodinville, WA (US); Balasubramanian Shyamsundar, Redmond, WA (US); Rohitha Hewawasam, Redmond, WA (US); Leon E. Welicki, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 103 days.

This patent is subject to a terminal disclaimer.

(21) Appl. No.: 16/406,361

(22) Filed: May 8, 2019

(65) Prior Publication Data
US 2019/0347131 A1 Nov. 14, 2019

Related U.S. Application Data (63) Continuation of application No. 15/814,861, filed on Nov. 16, 2017, now Pat. No. 10,303,513, which is a continuation of application No. 13/798,152, filed on Mar. 13, 2013, now Pat. No. 9,846,597.

(51) Int. Cl.
*G06F 9/46* (2006.01)
*G06F 9/50* (2006.01)
*G06F 9/448* (2018.01)
*G06F 9/48* (2006.01)

(52) U.S. Cl.
CPC .............. *G06F 9/50* (2013.01); *G06F 9/4482* (2018.02); *G06F 9/4843* (2013.01)

(58) Field of Classification Search
CPC ........................................................ G06F 9/52
USPC ........................................................ 718/104
See application file for complete search history.

(56) References Cited

U.S. PATENT DOCUMENTS

| | | | |
|---|---|---|---|
| 6,219,711 B1 * | 4/2001 | Chari | G06F 13/4081 709/218 |
| 6,253,252 B1 * | 6/2001 | Schofield | G06F 9/547 719/315 |
| 6,868,541 B1 * | 3/2005 | Such | G06F 9/542 718/104 |
| 7,248,603 B1 * | 7/2007 | Grunkemeyer | G06F 9/547 370/466 |
| 7,958,497 B1 * | 6/2011 | Lindo | A63F 13/497 717/128 |
| 8,335,982 B1 * | 12/2012 | Colton | G06F 9/44521 715/234 |
| 8,516,498 B2 * | 8/2013 | Mehta | G06Q 10/087 719/313 |

(Continued)

*Primary Examiner* — Mehran Kamran
(74) *Attorney, Agent, or Firm* — Rainier Patents, P.S.

(57) ABSTRACT

Aspects of the subject matter described herein relate to durable program execution. In aspects, a mechanism is described that allows a program to be removed from memory when the program is waiting for an asynchronous operation to complete. When a response for the asynchronous operation is received, completion data is stored in a history, the program is re-executed and the completion data in the history is used to complete the asynchronous operation. The above actions may be repeated until no more asynchronous operations in the history are pending completion.

20 Claims, 6 Drawing Sheets

(56) References Cited

U.S. PATENT DOCUMENTS

| | | | | |
|---|---|---|---|---|
| 8,584,004 B2* | 11/2013 | Rae | G06Q 40/04 | 715/219 |
| 8,701,096 B2* | 4/2014 | Iyer | G06F 9/4843 | 717/151 |
| 8,893,090 B2* | 11/2014 | Halliday | G06F 11/3632 | 717/127 |
| 9,152,549 B1* | 10/2015 | Kesselman | G06F 12/023 | |
| 2003/0101293 A1* | 5/2003 | Stevens | G06F 9/548 | 719/330 |
| 2004/0030882 A1* | 2/2004 | Forman | G06F 9/445 | 713/100 |
| 2004/0153549 A1* | 8/2004 | Naito | H04L 29/06 | 709/228 |
| 2004/0243712 A1* | 12/2004 | Sakai | H04L 41/00 | 709/227 |
| 2006/0136930 A1* | 6/2006 | Kaler | G06F 9/4843 | 718/105 |
| 2008/0005737 A1* | 1/2008 | Saha | G06F 9/3004 | 718/100 |
| 2008/0313645 A1* | 12/2008 | Birrell | G06F 9/3004 | 719/312 |
| 2009/0105989 A1* | 4/2009 | Ramacher | G06F 11/0778 | 702/183 |
| 2009/0133033 A1* | 5/2009 | Lindo | G06F 11/3624 | 718/108 |
| 2009/0271693 A1* | 10/2009 | Rae | G06Q 40/04 | 715/219 |
| 2009/0292765 A1* | 11/2009 | Leedberg | G06F 9/541 | 709/203 |
| 2009/0293073 A1* | 11/2009 | Nathan | G06F 9/547 | 719/328 |
| 2009/0307308 A1* | 12/2009 | Siegemund | G06F 8/443 | 709/203 |
| 2010/0168912 A1* | 7/2010 | Lee | G06F 11/0766 | 700/245 |
| 2010/0205613 A1* | 8/2010 | Wang | G06F 9/547 | 719/315 |
| 2011/0082911 A1* | 4/2011 | Agnoni | H04L 61/1523 | 709/217 |
| 2011/0179303 A1* | 7/2011 | Taylor | G06F 11/1469 | 714/4.11 |
| 2011/0219380 A1* | 9/2011 | Toub | G06F 9/46 | 718/103 |
| 2011/0258594 A1* | 10/2011 | Syme | G06F 8/445 | 717/106 |
| 2012/0079463 A1* | 3/2012 | Freeman | G06F 8/70 | 717/137 |
| 2012/0254484 A1* | 10/2012 | Yang | G06F 9/545 | 710/47 |
| 2012/0266144 A1* | 10/2012 | Halliday | G06F 11/3664 | 717/129 |
| 2012/0284720 A1* | 11/2012 | Cain, III | G06F 9/4881 | 718/101 |
| 2013/0111436 A1* | 5/2013 | Phan | G06F 8/34 | 717/113 |
| 2013/0152104 A1* | 6/2013 | Paperin | G06F 9/541 | 718/107 |
| 2013/0167126 A1* | 6/2013 | Iyer | G06F 8/443 | 717/140 |
| 2013/0263095 A1* | 10/2013 | He | G06F 11/3664 | 717/129 |
| 2014/0115024 A1* | 4/2014 | Kriesing | G06F 9/45512 | 709/201 |
| 2014/0282625 A1* | 9/2014 | Chico de Guzman Huerta | G06F 9/547 | 719/320 |
| 2015/0106825 A1* | 4/2015 | Abbas | G06F 9/546 | 719/318 |

\* cited by examiner

DURABLE PROGRAM EXECUTION

CROSS-REFERENCE TO RELATED APPLICATIONS

This application claims priority to and is a continuation of co-pending U.S. patent application Ser. No. 15/814,861 entitled "Durable Program Execution" and filed Nov. 16, 2017 which is a continuation of U.S. patent application Ser. No. 13/798,152 entitled "Durable Program Execution" and filed Mar. 13, 2013, the entire disclosures of which are hereby incorporated by reference.

BACKGROUND

A long-running program may have extensive periods of time between events that involve processing. To conserve resources, the program may be required to save its state between events so that the program can be shut down and removed from memory until the next event applicable to the program is received. This may be done, among other reasons, to make room for other programs to execute on the computing resources. To accommodate the requirement to save state, a programmer may write code that saves state to storage in conjunction with processing an event. The programmer may also write code that loads the state from storage and resumes with the appropriate action when a new event is received. This is cumbersome to programmers.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to durable program execution. In aspects, a mechanism is described that allows a program to be removed from memory when the program is waiting for an asynchronous operation to complete. When a response for the asynchronous operation is received, completion data is stored in a history, the program is re-executed, and the completion data in the history is used to complete the asynchronous operation. The above actions may be repeated until no more asynchronous operations in the history are pending completion.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Headings are for convenience only; information on a given topic may be found outside the section whose heading indicates that topic.

Other definitions, explicit and implicit, may be included below.

Exemplary Operating Environment

Figure 1:
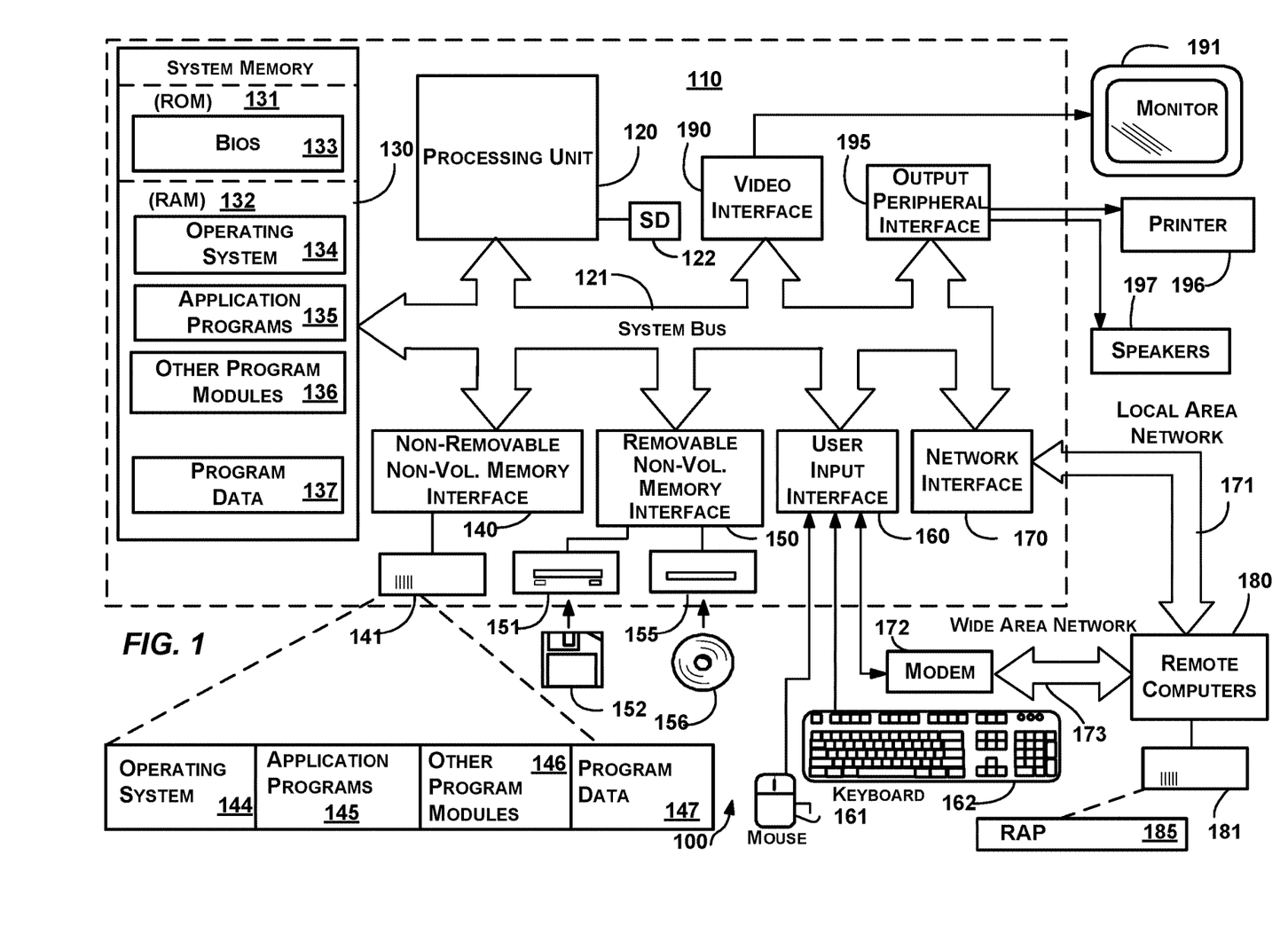
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and one or more system buses (represented by system bus 121) that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The processing unit 120 may be connected to a hardware security device 122. The security device 122 may store and be able to generate cryptographic keys that may be used to secure various aspects of the computer 110. In one embodiment, the security device 122 may comprise a Trusted Platform Module (TPM) chip, TPM Security Device, or the like.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Computer storage media does not include communication media.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM, DVD, or other optical media. Other removable/non-removable, volatile/nonvolatile computer storage media that can be used in the exemplary operating environment include magnetic tape cassettes, flash memory cards and other solid state storage devices, digital versatile discs, other optical discs, digital video tape, solid state RAM, solid state ROM, and the like. The hard disk drive 141 may be connected to the system bus 121 through the interface 140, and magnetic disk drive 151 and optical disc drive 155 may be connected to the system bus 121 by an interface for removable nonvolatile memory such as the interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 110 through input devices such as a keyboard 162 and pointing device 161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 120 through a user input interface 160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include phone networks, near field networks, and other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Durable Program Execution

As mentioned previously, a program may have periods of time between events that involve processing. For example, a program that facilitates a workflow that involves humans may have days or weeks between events. For example, in an editing workflow, a writing project may be commissioned on one day and it may be several days or months before any activity on the writing project happens. After a draft is completed, it may be several days before editing commences. Even in programs that deal with strictly automated processes, the time between events may be long (e.g., relative to CPU time) even if the events are only minutes or seconds apart.

Figure 2:
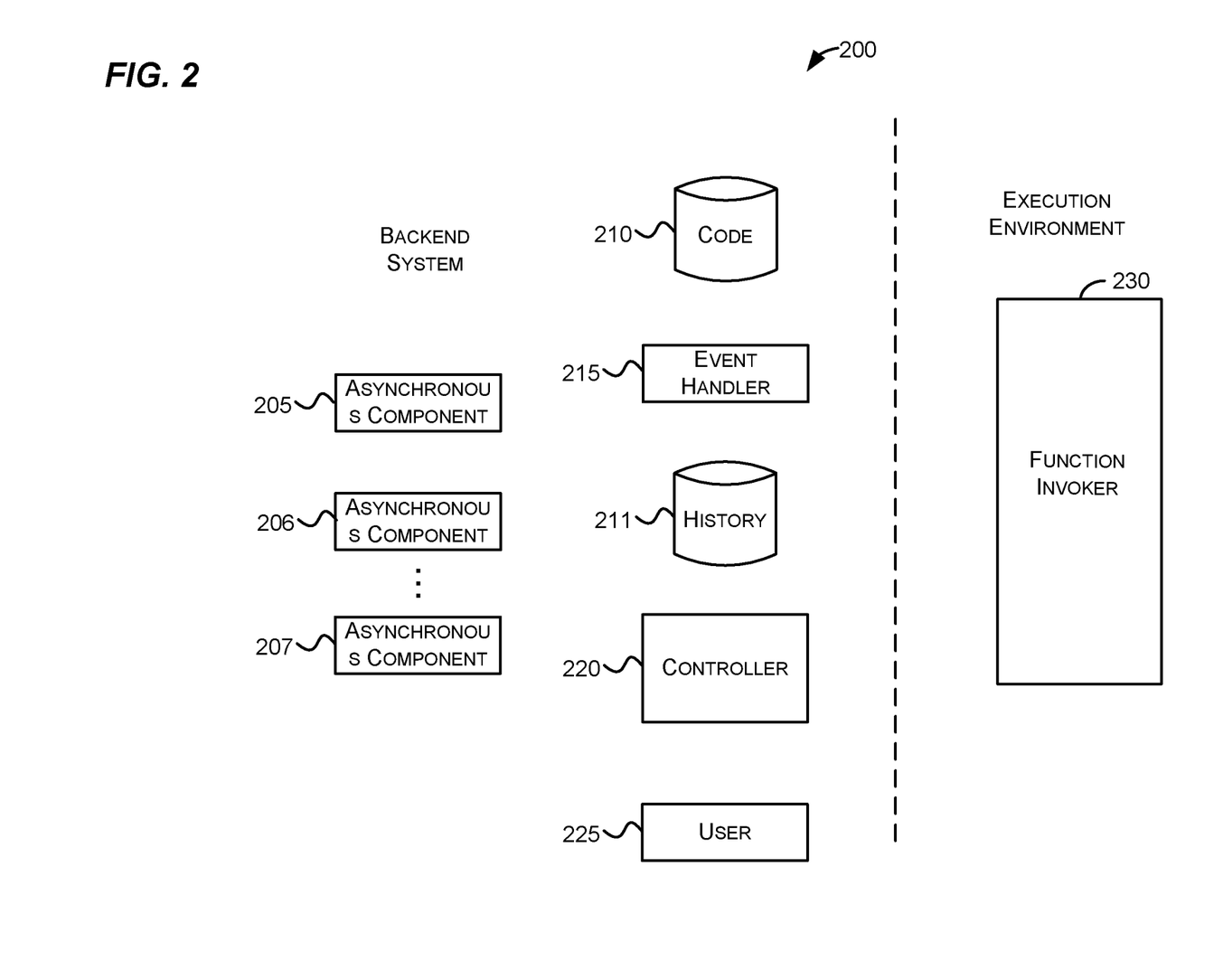
FIG. 2 is a block diagram that generally represents exemplary components for durable program execution in accordance with aspects of the subject matter described herein.

FIG. 2 is a block diagram that generally represents exemplary components for durable program execution in accordance with aspects of the subject matter described herein. The components illustrated in FIG. 2 are exemplary and are not meant to be all-inclusive of components that may be needed or included. Furthermore, the number of components may differ in other embodiments without departing from the spirit or scope of aspects of the subject matter described herein. In some embodiments, the components described in conjunction with FIG. 2 may be included in other components (shown or not shown) or placed in subcomponents without departing from the spirit or scope of aspects of the subject matter described herein. In some embodiments, the components and/or functions described in conjunction with FIG. 2 may be distributed across multiple devices.

As used herein, the term component is to be read to include hardware such as all or a portion of a device, a collection of one or more software modules or portions thereof, some combination of one or more software modules or portions thereof and one or more devices or portions thereof, and the like.

For example, the components illustrated in FIG. 2 may be implemented using one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like.

An exemplary device that may be configured to implement one or more of the components of FIG. 2 comprises the computer 110 of FIG. 1.

A component may also include or be represented by code. Code includes instructions that indicate actions a computer is to take. Code may also include information other than actions the computer is to take such as data, resources, variables, definitions, relationships, associations, and the like.

Code may be executed by a computer. When code is executed by a computer, this may be called a process. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or a single device. Code may execute in user mode, kernel mode, some other mode, a combination of the above, or the like.

As illustrated, the environment 200 includes asynchronous components 205-207, a code store 210, a history store 211, an event handler 215, a controller 220, a function invoker 230 and may include other components (not shown). A user interacting with the system is shown as user 225, but in another embodiment, the user may be replaced with a process, system, or the like, that invokes the code involving asynchronous operations.

The code store 210 and the history store 211 include any storage media capable of storing data. A store may include computer storage elements such as volatile memory (e.g., RAM or other volatile memory described previously) and/or non-volatile memory (e.g., hard drives or other non-volatile memory described previously). A store may be located entirely on one device or may be distributed across multiple devices. A store may be external, internal, or include components that are both internal and external to a storage system hosting the store. A store may include components to ensure that the store is transactional and durable.

The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The code store 210 stores code that is to be executed by the function invoker 230. This code may be in virtually any language, scripting, non-scripting, or otherwise.

The function invoker 230 is structured (e.g., via code and/or hardware) to execute and re-execute code from the code store 210. In executing code from the code store, an asynchronous operation may be encountered. An asynchronous operation is an operation that may complete independently of the main program flow. For example, a program may initiate an asynchronous operation by requesting a Web page. The request for a Web page may be serviced by another machine that may take a varying amount of time to service the request.

In one sense, a response is data that indicates that something has been done to satisfy an asynchronous operation. A response may include more or less information. In the Web page example above, a response may include the data of a Web page. Responses to other asynchronous operations, however, may include relatively little information. For example, a response may indicate that an asynchronous component was contacted and instructed to execute. A response may include a return code or other data provided by the asynchronous component. A response may include an error code that indicates that an error occurred in trying to satisfy an asynchronous operation.

When the function invoker 230 encounters an asynchronous operation in the code, first, the function invoker 230 may search the history store 211 for an indication of a completion of the asynchronous request. If a completion record is found, the function invoker 230 may provide completion data to the code. Completion data may indicate that the asynchronous operation has been executed, completed, and/or failed and may include response data, if any. If a completion record is not found, the function invoker 230 may send a command to the controller 220. The command may provide information about the operation and allow the controller 220 to process the asynchronous operation.

When the controller 220 receives a command from the function invoker 230, the controller 220 may process the command. In processing the command, the controller 220 may start an asynchronous operation and update the history 211 to mark the asynchronous operation as started. The controller 220 may perform these actions in the same transaction. To start an asynchronous operation controller 220 may schedule a task to cause a request to be made to an asynchronous component suitable for the asynchronous operation.

The asynchronous components 205-207 may include computer components or other entities that service asynchronous operations. A Web server has been previously described as one such component, but those skilled in the art will recognize many other components that may service asynchronous requests. For example, in one embodiment, the asynchronous components 205-207 may include only automated components that are built using hardware and/or software. In another embodiment, the asynchronous components 205-207 may include both automated components and humans or other entities. In some embodiments, the asynchronous components 205-207 may include computer components that obtain input from humans and/or other entities. For example, the servicing components may exist as code that executes on computers that reminds people involved in a workflow that certain tasks are to be completed and provided so that the workflow may proceed to completion.

If the history 211 does not include a completion record for the asynchronous operation, the function invoker 230 may continue to run the code, if any, that appears after the asynchronous operation unless the code is blocked on the asynchronous operation completing in which case the function invoker 230 may halt execution of the program and remove the program from memory without storing any additional state about the program.

When a response is received, the event handler 215 may update the history store 211 to indicate that an asynchronous component has responded to the asynchronous operation. The event handler 215 may also notify the function invoker 230 that a response has been received regarding the code previously executed. After receiving the notification, the function invoker 230 may re-execute the code from the start. When the asynchronous operation is executed again, the function invoker 230 may find the completion data in the history store 211. The function invoker 230 may supply the completion data to the code which may then complete the asynchronous operation.

The process described above may be repeated as many times as the code includes asynchronous operations. Eventually, the code may execute to completion and have all asynchronous requests completed during the last execution.

The above process allows the code and state to be removed from memory between executions and allows a software developer to write the code without worrying about saving state after handling each event.

Another example of how this works with some exemplary code is provided below. The exemplary code may include:

```
function(baseAddress)
{
    var getUserUrl = baseAddress + 'GetUser';
    var sendGrettingUrl = baseAddress + 'SendGretting';
    return context.httpSendWithPromise(
        {
            Method: 'Get',
            url:getUserUrl
        }).then(function(getUserResponse){
        var user = getUserResponse.responseText;
        return context.httpSendWithPromise(
            {
                Method: 'Post',
                url:sendGreetingUrl,
                body: user
            });
    });
}
```

The first time this code is invoked by the function invoker 230, an entry may be made in the history store 211 that identifies that the program has started execution. When the instruction "return context.httpSendWithPromise" is encountered, this may cause the function invoker 230 to be called. In response, the function invoker 230 may search the history store 211 to see if a completion data corresponding to the asynchronous operation is recorded therein.

If the history store 211 does not include the completion data, the function invoker 230 may provide a command to the controller 220. The command may include data regarding the asynchronous operation (e.g., Get and the getUserUrl). The controller 220 may then schedule a task to cause a request to be made to one of the asynchronous components 205-207 for the asynchronous operation. An entry may be made in the history store 211 that indicates that the task has been started.

When a response from the asynchronous component is received, the event handler 215 may store the completion data corresponding to the response in the history 211 and may update the history to indicate that the task has completed. The event handler 215 may also notify the function invoker 230 that a response has been received so that the function invoker 230 may re-executed the code.

When the code is re-executed, it may again encounter the instruction "return context.httpSendWithPromise". When the instruction is encountered, this may again cause the function invoker 230 to be called. In response, the function invoker 230 may again search the history store 211 for a response. This time, the function invoker 230 finds the completion data previously stored by the event handler 215. The function invoker 230 may then provide the completion data to the executing code which may then complete the asynchronous operation. The instructions of the "then(function(getUserResponse)" function may then be executed.

In the course of executing these instructions, the instruction "return context.httpSendWithPromise" may be executed. When this instruction is executed, the executing code may pass information to the function invoker 230. The function invoker 230 may again search the history store 211 for completion data corresponding to the asynchronous operation. In finding that the completion data for the asynchronous operation is not available in the history store 211, the function invoker 230 may send a command to the controller 220. In response, the controller 220 may schedule a task to cause an asynchronous request to be made to an appropriate asynchronous component.

When the function invoker 230 determines that completion data for an asynchronous operation is not currently available is the history store 211, the function invoker 230 may execute the code after the asynchronous operation (if the asynchronous operation is non-blocking) or halt the execution of the program and remove the program from memory without storing any additional state about the program. As indicated previously, the function invoker 230 may halt execution of a program if either of the two conditions below exist:

1. The end of the code has been reached; or
2. There is no response to an asynchronous operation AND the asynchronous operation is blocking.

In one example, the function invoker 230 may determine that a response to the asynchronous operation is currently not available if there are no more completion events in the history.

When a response to the second asynchronous request is received, the event handler 215 may update the history store 211 with completion data that includes the response received and may also notify the function invoker 230 that a response has been received regarding the code previously executed. In response, the function invoker 230 may again re-execute the code from the start of the code. As each asynchronous operation is executed from the executing code, the function invoker 230 may search the history 211, find the completion data (if it is available), and provide the completion data to the executing code which may then continue executing.

In this case, the code may execute to completion as completion data for both asynchronous requests are found in the history store 211. Upon completion, an entry may be logged that indicates that the code has completed. The entry may include the results returned by the executing code, if any.

Below are some exemplary entries that may be stored in the history store 211 corresponding to the actions described above:

```
StartExecution: (Input: ['http://foo', ...])
HttpTaskStarted: (EventId: 1, Request: {...}}
HttpTaskCompleted: {StartedEventId: 1, Response: {...}}
HttpTaskStarted: (EventId: 2, Request: {...}}
HttpTaskCompleted: {StartedEventId: 2, Response: {...}}
```

Below are some other exemplary entries that may, in one embodiment, also be stored. These entries may be stored in the history store 211, a task store (not shown), or some other store.

```
ScheduleHttpTask: {Id: 1, Request: {Url: 'getUser'}}
ScheduleHttpTask: {Id: 2, Request: {Url: 'sendGreeting', Body: {...}}}
CompleteCode: {Id: 3, Result: ...}
```

In another embodiment, these other exemplary entries are not persisted in a store.

FIGS. 3-6 are flow diagrams that generally represent exemplary actions that may occur in accordance with aspects of the subject matter described herein. For simplicity of explanation, the methodology described in conjunction with FIGS. 3-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Figure 3:
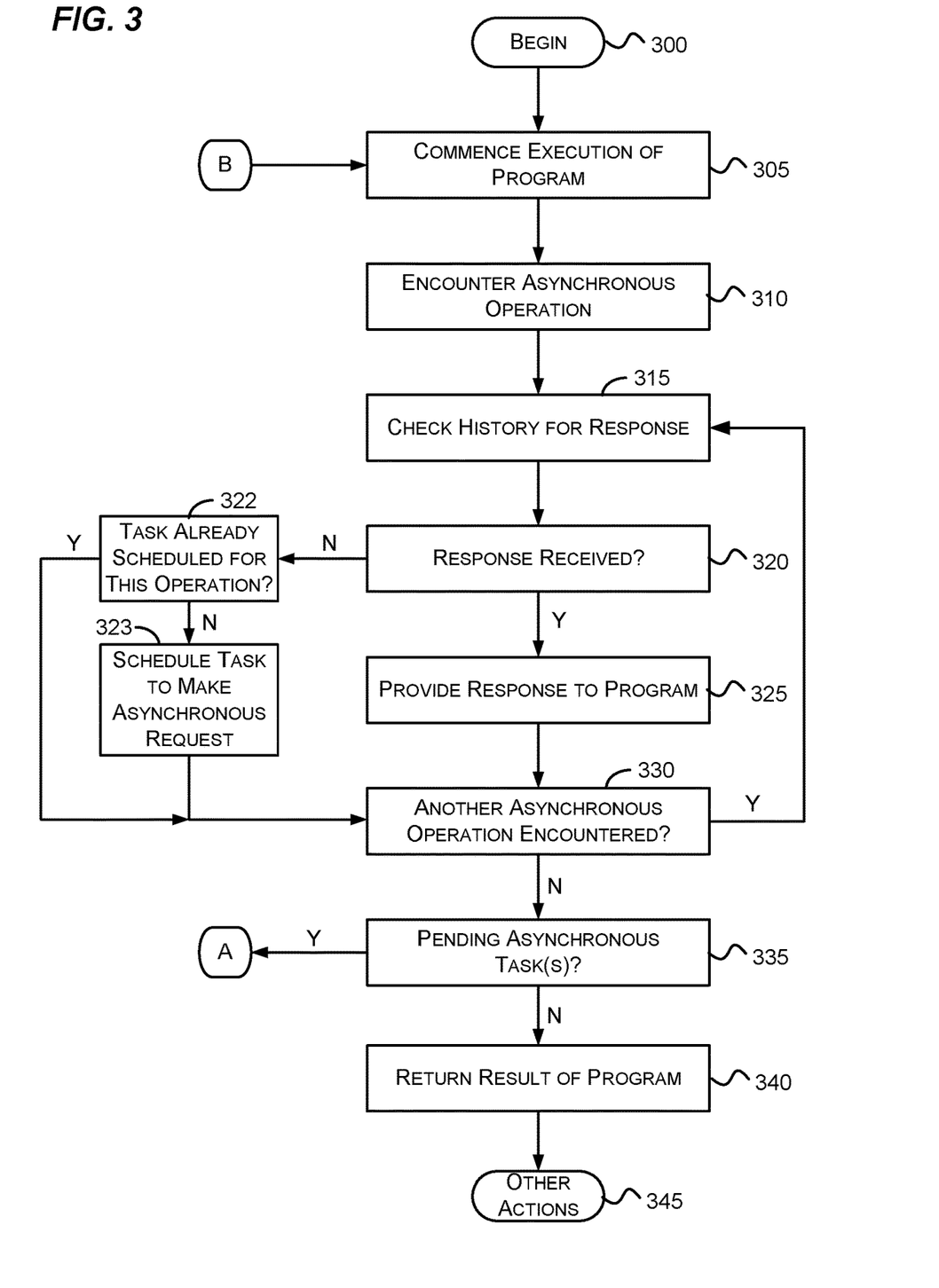
FIGS. 3-4 are flow diagrams that generally represent exemplary actions that may occur to obtain asynchronous operations from a program and responses thereto in accordance with aspects of the subject matter described herein.
Figure 4:
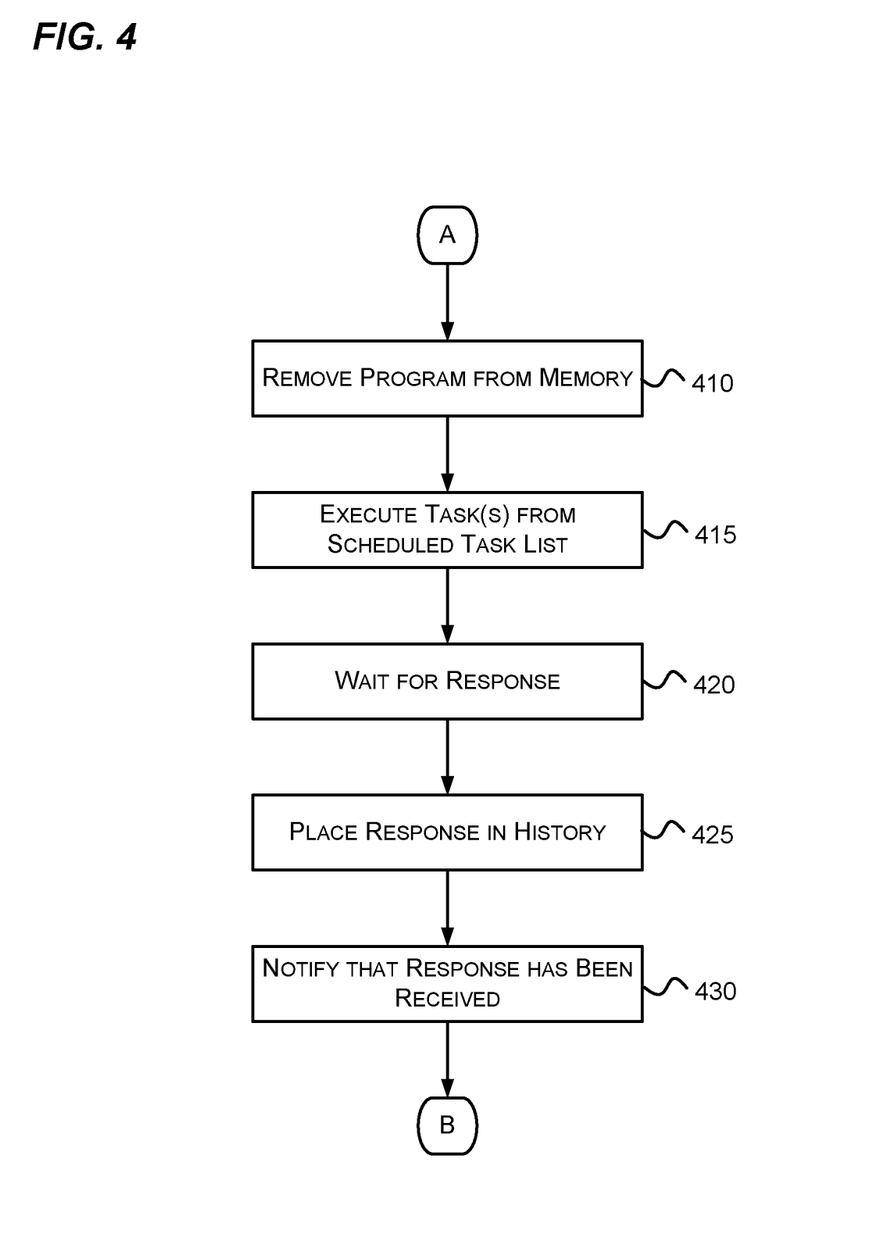

FIGS. 3-4 are flow diagrams that generally represent exemplary actions that may occur to obtain asynchronous operations from a program and responses thereto in accordance with aspects of the subject matter described herein. At block 300, the actions begin.

At block 305, program execution is commenced. For example, referring to FIG. 2, a program that is stored on the code store 210 (e.g., the program described above) is launched by the function invoker 230.

At block 310, an asynchronous operation is encountered in the program. For example, the following code is executed:

```
return context.httpSendWithPromise(
{
    Method: 'Get',
    url:getUserUrl
}
```

At block 315, a history is checked to determine whether a response has been received to the asynchronous operation. For example, referring to FIG. 2, the function invoker 230 checks the history store 211 to determine whether a response has been received for the request. Checking the history may include searching the history of an identifier associated with the response. When the identifier is located, the data associated with the identifier may be retrieved from the history and synchronously provided to the executing program even though the data was received asynchronously to the first time the program encountered the asynchronous operation.

At block 320, if a response has not been received, the actions continue at block 322; otherwise, the actions continue at block 325.

At block 322, a check is made as to whether a task is already scheduled for the encountered operation. If so, the actions continue at block 330; otherwise, the actions continue at block 323. For example, in re-executing a program, an asynchronous operation may be encountered for which a task was scheduled but for which no response has yet been received.

At block 323, a task is scheduled to make an asynchronous request. For example, referring to FIG. 2, the controller 220 may schedule a task to call one of the asynchronous components 205-207 in response to an asynchronous operation encountered within the program executed by the function invoker 230.

At block 325, completion data is obtained from the history and provided to the program. For example, referring to FIG. 2, the function invoker 230 obtains the completion data from the history store 211 and provides the completion data to the executing program.

At block 330, if another asynchronous request is encountered while executing the program, then the actions continue at block 315; otherwise, the actions continue at block 335.

At block 335, a determination is made as to whether there are any pending asynchronous task(s). If so, the actions continue at block 410 of FIG. 4; otherwise, the actions continue at block 340 of FIG. 3.

At block 340, the result (e.g., the return code or data) from the program is returned. For example, referring to FIG. 3, the function invoker 230 returns the results of executing the code to the user 225 via a display.

At block 340, other actions, if any, may be performed.

Turning to FIG. 4, in one embodiment, at block 410, the program may be removed from memory if conditions described previously are met. For example, referring to FIG. 2, the function invoker 230 may remove that executing program from memory. Removing may include marking the memory as free, instructing another component to kill the program, or any other activity that indicates that the program may be stopped and the memory re-used for other purposes. In one embodiment, the program may be marked for deletion but not removed unless it is determined that more resources are needed.

At block 415, one or more tasks from the task list are executed. For example, referring to FIG. 2, the controller 220 (or another component) executes a task that was previously placed in the history store 211 and sends a request to one of the asynchronous components 205-207.

At block 420, waiting for the response is performed. Waiting may involve doing nothing or engaging in other actions related or non-related to the response. For example, waiting may involve spawning a thread to wait for the response while also executing other threads that do not depend on the response. For example, referring to FIG. 2, the function invoker 230 may execute other code and the other components may engage in other activities while waiting for a response.

At block 425, when the response is received, it is placed in a history. For example, referring to FIG. 2, the event handler 215 may place completion data corresponding to the response received from the appropriate asynchronous component into the history store 211. Placing the data into the history may involve storing the completion data corresponding to the response together with an identifier that associates the completion data with the asynchronous operation and/or the program executing the asynchronous operation.

At block 430, a notification is provided that a response has been received. For example, referring to FIG. 2, the event handler 215 may notify the function invoker 230 that a response has been received and may indicate the program for which the response was received.

After block 430, the actions continue at block 305 of FIG. 3.

Figure 5:
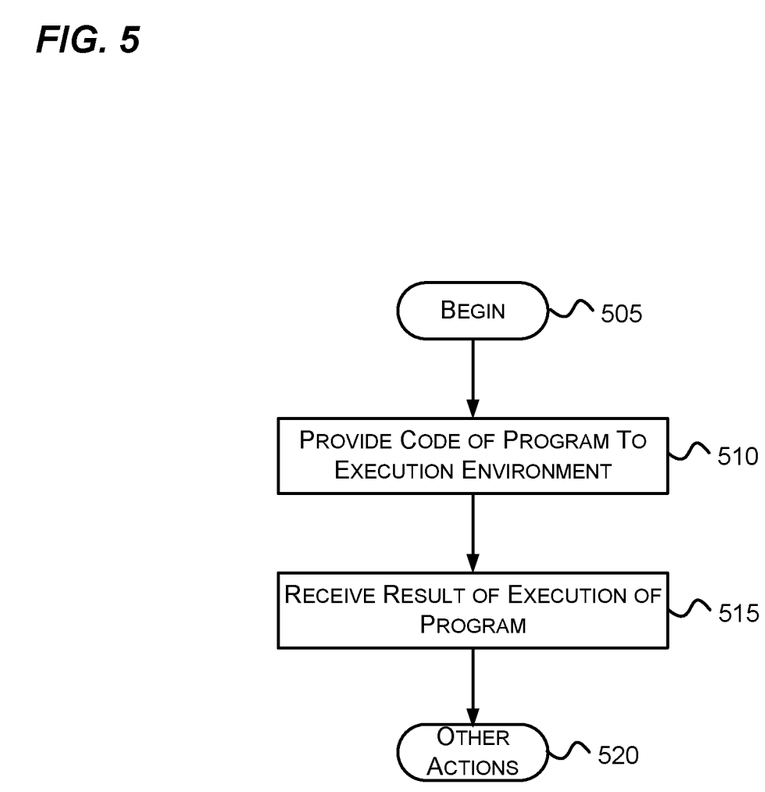
FIG. 5 is a flow diagram that generally represents exemplary actions that may occur in providing code to an execution environment in accordance with aspects of the subject matter described herein.

FIG. 5 is a flow diagram that generally represents exemplary actions that may occur in providing code to an execution environment in accordance with aspects of the subject matter described herein. At block 505, the actions begin.

At block 510, code of a program is provided to an execution environment. For example, referring to FIG. 2, the user 225, a computer process, or the like may provide an indication to the function invoker 230 of the existence of program that is to be executed. The indication may indicate the name, location, or other information that identifies the program. For example, the indication may identify code stored in the code store 210.

At block 515, after the code of the program has been executed and re-executed until all asynchronous operations of the program have been satisfied by the history, results regarding the execution of the program are received. For example, referring to FIG. 2, the user 225, a computer process, or the like may receive an indication of the results of executing the program. This result may be received after the program is able to successfully execute from beginning to end having responses to all of its asynchronous requests.

At block 520, other actions, if any, may be performed.

Figure 6:
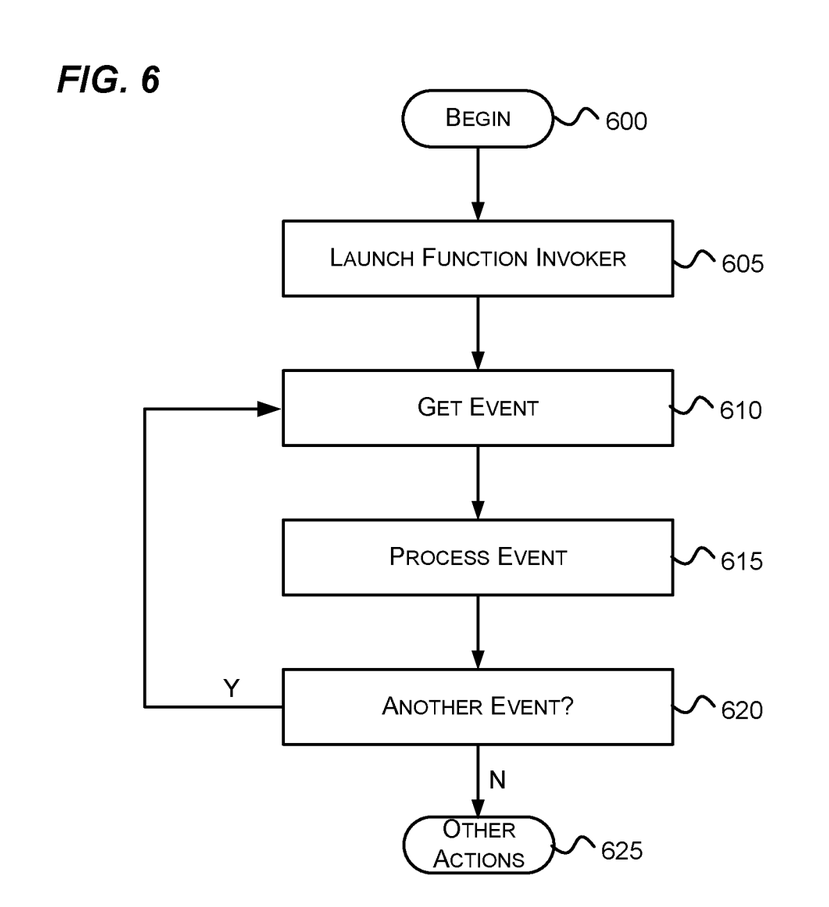
FIG. 6 is a flow diagram that generally represents exemplary actions that may occur for a function invoker in accordance with aspects of the subject matter described herein.

FIG. 6 is a flow diagram that generally represents exemplary actions that may occur for a function invoker in accordance with aspects of the subject matter described herein. At block 600, the actions begin.

At block 605, the function invoker is launched. For example, referring to FIG. 2, the function invoker 230 may be launched by the event handler 215 after a new event for a program is received by the event handler 215. As another example, the function invoker 230 may be launched by the user 225 or a process (not shown).

At block 610, after being launched, the function invoker may obtain an event in the history. For example, referring to FIG. 2, the function invoker 230 may obtain the first event in the history store 211.

At block 615, the function invoker may process the event. For example, if the event is a completion event that corresponds to an asynchronous operation indicated by a program, the function invoker may provide completion data of the completion event to the program.

At block 620, the function invoker determines if there is another event in the history, the actions continue at block 610; otherwise, the actions continue at block 625. For example, referring to FIG. 2, if the history store 211 includes several events, the function invoker 230 may determine if there is another event that the function invoker 230 has not processed. If so, the actions continue at block 610; otherwise, the actions continue at block 625.

At block 625, other actions if any, are performed.

As can be seen from the foregoing detailed description, aspects have been described related to durable program execution. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   executing and re-executing code indicating asynchronous operations and supplying respective completion data in response to individual asynchronous operations indicated by the code until all of the asynchronous operations indicated by the code are satisfied by associated completion data included in a history;
   scheduling a task for sending a particular request corresponding to a particular asynchronous operation to a particular asynchronous component operable to respond to the particular request, wherein the particular asynchronous operation comprises requesting a web page and the code is removed from memory based upon a determination that the code is waiting for the particular asynchronous operation to complete and before the code has received responses to all requests made by the code; and,
   providing a result of executing and re-executing the code, wherein the history is populated from individual responses received from one or more asynchronous components to which individual requests have been sent, the individual requests corresponding to the individual asynchronous operations indicated by the code.

2. The method of claim 1, wherein the at least one of the asynchronous operations comprises obtaining input from a human.

3. The method of claim 1, further comprising:
   receiving notification that new completion data for the code has been received, the notification indicating a program for which a corresponding response was received.

4. The method of claim 3, further comprising:
   loading and re-executing the code in response to receiving the notification that the new completion data for the code has been received.

5. The method of claim 1, further comprising:
   supplying, from the history, the associated completion data to the asynchronous operations indicated by the code.

6. The method of claim 1, further comprising:
   updating the history with the respective completion data, wherein the respective completion data is derived from the individual responses received from the one or more asynchronous components.

7. The method of claim 1, wherein scheduling the task for sending the particular request to the particular asynchronous component is performed in response to a command informing that the code is indicating the particular asynchronous operation.

8. In a computing environment, a system comprising:
   a store having computer storage elements with code stored therein, the code when executed, indicating asynchronous operations, a particular asynchronous operation comprising obtaining input from a human;
   a controller structured to schedule tasks for sending requests corresponding to the asynchronous operations to one or more asynchronous components operable to respond to the requests;
   a function invoker structured to execute and re-execute the code and to supply respective completion data in response to individual asynchronous operations indicated by the code until all of the asynchronous operations indicated by the code are satisfied by associated completion data included in a history, the history populated from responses received from the one or more asynchronous components to which the requests have been sent, wherein the function invoker is further structured to remove the code from memory based upon a determination that the code is waiting for at least one of the asynchronous operations to complete and before the code has received responses to all of the requests made by the code; and
   an event handler structured to notify the function invoker that new completion data for the code has been received.

9. The system of claim 8, wherein the function invoker is further structured to load and re-execute the code in response to the event handler notifying the function invoker that the new completion data for the code has been received.

10. The system of claim 8, wherein the at least one of the asynchronous operations on which the code is waiting is the particular asynchronous operation that comprises obtaining input from the human.

11. The system of claim 8, wherein the event handler is further structured to update the history with the respective completion data, wherein the respective completion data is derived from the responses received from the one or more asynchronous components.

12. The system of claim 8, wherein the controller is further structured to schedule the tasks to send the requests in response to commands received from the function invoker, the commands informing the controller that the code is indicating the individual asynchronous operations.

13. The system of claim 8, further comprising a history store having computer storage elements for storing information regarding the tasks and the associated completion data.

14. A computer storage media having computer-executable instructions which, when executed, perform actions comprising:
   executing and re-executing code indicating asynchronous operations and supplying respective completion data in response to individual asynchronous operations indicated by the code until all of the asynchronous operations indicated by the code are satisfied by associated completion data included in a history;
   scheduling a particular task for sending a particular request corresponding to a particular asynchronous operation to a particular asynchronous component operable to respond to the particular request, wherein the particular asynchronous operation comprises obtaining input from a human involved in a workflow indicating that a certain task is to be completed and provided so that the workflow may proceed to completion, and wherein the code is removed from memory based upon a determination that the code is waiting for the particular asynchronous operation to complete and before the code has received responses to all asynchronous requests made by the code; and,
   providing a result of executing and re-executing the code, wherein the history is populated from individual responses received from one or more asynchronous components to which individual requests have been sent, the individual requests corresponding to the individual asynchronous operations indicated by the code.

15. The computer storage media of claim 14, wherein the particular asynchronous operation comprises obtaining editing input from the human, the editing input relating to a writing project.

16. The computer storage media of claim 14 having further computer-executable instructions which, when executed, perform further actions comprising:
   receiving notification that new completion data for the code has been received.

17. The computer storage media of claim 16 having further computer-executable instructions which, when executed, perform further actions comprising:
   loading and re-executing the code in response to receiving the notification that the new completion data for the code has been received.

18. The computer storage media of claim 14 having further computer-executable instructions which, when executed, perform further actions comprising:
   supplying, from the history, the respective completion data to the individual asynchronous operations indicated by the code.

19. The computer storage media of claim 14 having further computer-executable instructions which, when executed, perform further actions comprising:
   updating the history with the respective completion data, wherein the respective completion data is derived from the individual responses.

20. The computer storage media of claim 14, wherein the particular task to send the particular request to the particular asynchronous component is performed in response to a command informing that the code is indicating the particular asynchronous operation.

\* \* \* \* \*